United States Patent [19]
Chapman et al.

[11] Patent Number: 6,050,800
[45] Date of Patent: Apr. 18, 2000

[54] SIZING APPARATUS

[75] Inventors: Peter Glanville Chapman, Greenwich; Allan Kenneth Wallace, Tranmere; Leslie Herbert Cowling, Burton Park, all of Australia; Eino Holso, Svaneholm, Sweden; Jyri Jarvenkyla, Hollola, Finland

[73] Assignees: Vindex Tubemakers Pty. Limited, Australia; Uponor B. V., Netherlands

[21] Appl. No.: 09/029,690
[22] PCT Filed: Sep. 16, 1996
[86] PCT No.: PCT/AU96/00585
   § 371 Date: Mar. 13, 1998
   § 102(e) Date: Mar. 13, 1998
[87] PCT Pub. No.: WO97/10093
   PCT Pub. Date: Mar. 20, 1997

[30] Foreign Application Priority Data

Sep. 15, 1995 [AU] Australia .................. PN5474

[51] Int. Cl.⁷ .................................. B29C 47/90
[52] U.S. Cl. ............... 425/71; 264/209.4; 425/326.1; 425/387.1; 425/392
[58] Field of Search .................. 425/67, 70, 71, 425/392, 387.1, 388, 326.1; 264/209.4

[56] References Cited

U.S. PATENT DOCUMENTS

| | | | |
|---|---|---|---|
| 3,546,745 | 12/1970 | Ball | 425/71 |
| 3,804,567 | 4/1974 | Recknagel | 425/71 |
| 3,990,828 | 11/1976 | Reifenhauser | 425/326.1 |
| 4,272,231 | 6/1981 | Schott, Jr. | 425/72 R |
| 4,543,051 | 9/1985 | Maillefer | 425/71 |
| 5,139,402 | 8/1992 | Topf | 425/71 |
| 5,516,270 | 5/1996 | Lehtinen | 425/71 |
| 5,648,102 | 7/1997 | Czarnik | 425/71 |

FOREIGN PATENT DOCUMENTS

| | | |
|---|---|---|
| 1456222 | 11/1976 | Australia . |
| 0385285 | 9/1990 | European Pat. Off. . |
| 4333480 | 4/1995 | Germany . |
| 08428 | 1/1978 | Japan . |
| 81805 | 10/1979 | Japan . |
| 405206 | 4/1980 | Japan . |
| 94085879 | 1/1994 | Japan . |
| 86324583 | 4/1986 | U.S.S.R. . |
| WO 9002644 | 3/1990 | WIPO . |
| WO 9104147 | 4/1990 | WIPO . |

*Primary Examiner*—Harold Pyon
*Assistant Examiner*—Joseph Leyson
*Attorney, Agent, or Firm*—Hayes, Soloway, Hennessey, Grossman & Hage, P.C.

[57] ABSTRACT

A sizing sleeve for controlling the diameter of plastic tube includes pressurized sizing sleeve portions in which fluid is injected under pressure about the tube circumference to form a lubricating layer. Drainage zones axially separate and isolate adjacent pressurized portions to allow independent temperature and pressure control. Each pressurized portion has flow stabilizer reducing variations in flow responsive to changes in the lubricating layer pressure. The flow stabilizer may comprise a high pressure fluid source and high pressure drop constrictor comprising fine apertures, which may be formed as grooves milled into end surface of abutting sizing sleeve segments.

20 Claims, 6 Drawing Sheets

SIZING APPARATUS

BACKGROUND OF THE INVENTION

The present invention relates to a sizing sleeve arrangement for controlling the outer diameter of a plastics tube being produced by a continuous tube forming process such as extrusion, or by an expansion process such as that generally described in International Patent Application No. WO 90/02644, wherein the tube at least in the region of the sizing sleeve is under positive internal pressure. The invention also relates to a method of controlling the diameter using the sizing sleeve.

It is known to provide sizing sleeves for tube diameter control with passages allowing the injection of lubricating water between the sleeve and the travelling tube, for example as achieved by a helical channel about the sleeve as described in PCT/FI90/00214 and EP 0 385 285 A2. In the case where the inside of the tube is not pressurized, these sizing sleeves may also have apertures in the sizing sleeve for applying a vacuum to the outside of the tube.

SUMMARY OF THE INVENTION

In one form the invention provides a sizing sleeve for controlling the outer diameter of an internally pressurized plastic tube travelling through the sizing sleeve, the sizing sleeve having an upstream and downstream end relative to the tube travel, including at least two pressurized sizing sleeve portions each having means for injecting fluid under pressure substantially about the circumference of the tube to form a lubricating fluid layer between a sizing sleeve inner surface and the tube, characterised in that the pressurized sizing sleeve portions being axially separated and isolated from each other by a drainage zone.

A further form of the invention provides a sizing sleeve for controlling the outer diameter of an internally pressurized plastic tube travelling through the sizing sleeve, the sizing sleeve having an upstream and downstream end relative to the tube travel, including means for injecting fluid under pressure substantially about the circumference of the tube to form a lubricating fluid layer between a sizing sleeve inner surface and the tube, characterised in that the fluid injection means includes flow stabilizing means which reduces variation in the rate of fluid injection caused by pressure variations in the lubricating layer.

In one preferred form, an inner sizing sleeve member comprises a plurality of coaxial rings arranged end to end, the injection apertures being formed as grooves in one or more end surfaces of the rings. Preferably, the drainage zone has a total drainage aperture area greater than the total injection aperture area of the immediately upstream pressurized portion. The drainage apertures may be formed as a gap between adjacent rings.

BRIEF DESCRIPTION OF THE DRAWINGS

Further preferred embodiments will now be described with reference to the accompanying drawings, in which.

DESCRIPTION OF THE PREFERRED EMBODIMENTS

Figure 1:
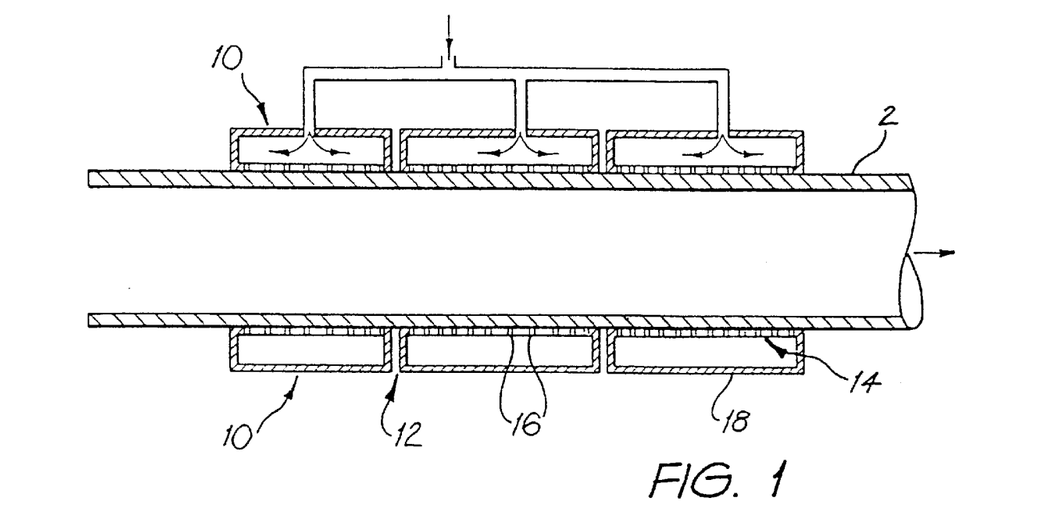
FIG. 1 is a schematic longitudinal cross-section showing a first embodiment.

With reference to FIG. 1, the extruded tube 2 is formed to approximately the desired outside diameter, but requires calibration to ensure conformance to required specifications. While the material of the tube is still sufficiently plastic to be shaped, the tube approaches a sizing apparatus for fine control of the final outside diameter. In the context of the present invention the extruded tube is under positive internal pressure, thus pressing the tube against the cylindrical inner surface of the sizing apparatus. Cooling is applied to the extruded tube within and downstream of the sizing apparatus to lock in the final diameter.

The illustrated sizing sleeve means consists of a plurality of pressurised sizing sleeve portions 10 alternated with drainage zones 12. In the arrangement of FIG. 1, each drainage zone may be a small gap between adjacent pressurized portions 10 of the sizing sleeve means, allowing sufficient area for the water injected in the previous pressurized portion to escape and isolating adjacent pressurized portions but insufficient unsupported length to allow substantial outwards creep of the tube.

Each pressurized portion 10 is formed as a jacketed tube, the inner tube 14 being perforated with a large number of injection apertures 16. Cool water from a high pressure source 17 is introduced under pressure to the annular manifold space between the inner 14 and outer 18 tubes and is injected through the apertures 16 to form a fine layer of water which both lubricates the movement of the tube past the inner surface of the sizing sleeve and cools the outside of the tube to lock in the final tube diameter.

The sizing sleeve means is also adapted for the situation where the tube entering the sizing sleeve is not at its extruded diameter, but is instead being diametrically expanded in order to impart circumferential orientation of the polymer molecules. In the arrangements described in International Patent Application Nos. WO 90/02644 and PCT/AU94/00784, the tube is expanded by means internal fluid pressure restrained by an inflatable plug. A sizing sleeve according to the invention may be located at the downstream limit of expansion of the tube in order to provide final diameter control of the expanded tube.

The separation of the pressurized portions 10 by drainage zones 12 allows the injected water from the upstream pressurized portion to escape, preventing build up of water between the tube and the sleeve inner surface, which can result in fluctuations in diameter of the resultant tube.

The drainage zones further allow isolation of pressure zones and limit or eliminate pressure communication between them. The present applicants have found that, if this is not the case, an oscillatory system can be set up due to interactions between axially moving deformations on the tube and the pressure field within the injected fluid. Isolation of pressure zones allows the pressure profile to be set and maintained at a specified profile without "cross-talk" or interference between zones.

The pressure of the fluid layer between the sleeve inner surface and the tube will be substantially equal to the internal pressure in the tube less a component due to the elastic and viscous resistance of the tube wall.

In practice, the wall thickness of the tube being extruded will typically vary by ±10%, which will cause variation of a similar magnitude in the elastic and viscous resistance to the internal pressure. As the tube wall resists a large component, typically 60–90%, of the internal pressure, and the lubricating layer pressure is therefore only the remaining 10–40%, the 10% variation in resistance translates to about ±50% variation in the lubricating layer pressure.

The sizing apparatus preferably includes injection fluid flow rate stabilizing means which substantially reduces variation in the rate of fluid injection caused by pressure variations of the lubricating layer. Preferably the fluid flow rate stabilizing means causes a 50% variation in the lubricating layer pressure to result in less than 20%, preferably less than 10%, variation in the injection rate.

In one arrangement, the flow rate stabilizing means can control the fluid supply to the injection apertures 16, for example comprising a flow control device 28 (see FIG. 2) placed in the fluid supply lines to each of the pressurized portions 10. The flow control device 28 may be high pressure drop constriction, such as an orifice, provided with substantial excess pressure at its upstream side so that normal variations in pressure at the downstream side have little effect on the flow rate through the device. For example, the pressure drop caused by the constriction device should be greater than the lubricating layer pressure.

In order to provide sufficient flow rate stability, the pressure provided by the fluid source is preferably at least 100% and most desirably at least 150% of the maximum internal pressure, at least in the pressurized portion adjacent the entry end of the sizing sleeve. At this point, the tube wall is in a plastic state and the elastic resistance to the internal pressure is at its lowest, but will still counteract a very significant proportion of the internal pressure and thus the fluid source pressure will be substantially greater than the lubricating layer pressure. As the tube progresses through the sizing sleeve, the outer surface of the tube is cooled by the fluid film and the thickness of the outer hardened portion of the tube progressively increases until the tube no longer requires diametral support from the film pressure to hold its diameter under the stress of the internal pressure. Thus, the fluid supply pressure can be reduced progressively along the sizing sleeve if desired.

Alternatively, the high pressure source and orifice may be substituted by a mechanical flow control device which adjusts to keep the flow rate relatively constant.

Figure 2:
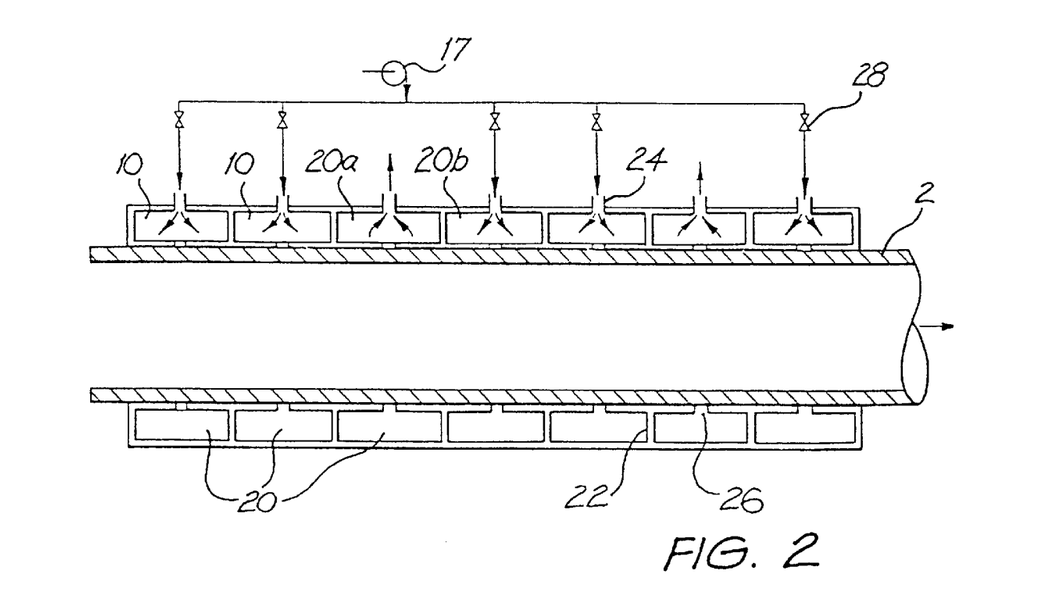
FIG. 2 is a similar view of a second embodiment.

The drainage zones can be simply a gap 12 between adjacent pressurized sleeve portions, as shown in FIG. 1. Alternatively, the drainage zones can be part of a continuous sizing sleeve, as shown in FIG. 2. In this embodiment, the sizing sleeve is formed as a jacketed tube, the inner tube having a plurality of apertures or circumferential slots 26 therethrough.

The region between the inner and outer tubes is divided into a plurality of regions 20 by a series of radial walls 22, with each region having a spigot 24 or other means for connection of fluid supply/outlet tubes. The regions 20b to which a supply of fluid under pressure is connected act as pressurized portions as in FIG. 1, while those regions 20a to which fluid outlet tubes are connected act as collection manifolds and thus drainage zones.

This arrangement allows flexibility in function, as the relative length of the pressurized portions and drainage zones can be varied to suit process conditions, by changing the number and order of the regions connected to fluid supply or to outlet. For example, in FIG. 2 the pressurized portions 10 have a length consisting of two successive regions, followed by drainage zones of one region.

In the arrangement of FIG. 2 the apertures in each sizing sleeve portion are relatively large, for example at least 1 mm per 100 mm tube diameter or a circumferential slot 26 to present minimal pressure drop to the fluid injection and drainage. The pressure of the manifold is therefore approximately equal to the lubrication layer pressure. Each pressurized manifold is connected to the high pressure fluid source 17 via a flow stabilising means 28 as discussed above. It is preferred that each manifold is connected to the source 17 via a separate flow stabilizer 28, so that fluctuations in tube wall thickness will not cause one chamber to inject excessive water at the expense of the other chambers.

In an unillustrated modification of FIG. 2, the injection slots 26 or apertures can be divided into a number of circumferential sectors and the fluid supply to each sector made independent by providing each with its own flow stabiliser. Alternatively, each sector can be provided with a separate fluid supply. This latter arrangement can be used to control fluid supply pressure to each part of the sleeve circumference independently. The applicant has determined that the eccentricity in the circularity and wall thickness of the tube approaching the sizing device is often caused by pin offset in the extruder head producing the tube. Such eccentricity is regular and predictable, and thus may be amenable to compensation by independent control of the injection fluid in the sizing device in a number, for example three to eight, of circumferential sectors.

An alternative means of attaining flow stability is to inject fluid through a large number of fine apertures, for example less than about 0.5 mm and more preferably less than about 0.25 mm in hydraulic diameter. For larger tube diameters e.g. over 100 mm, flow stability may be achieved using apertures of hydraulic diameter less than 0.5% of the tube diameter. These fine apertures restrict the flow therethrough, maintaining the high pressure drop between the fluid supply and the lubricating fluid layer, so that flow through each hole is substantially independent and does not vary substantially even if the tube wall is spaced from the inner surface of the sizing sleeve in the vicinity of the hole due to local deformation or eccentricity in the tube. Thus, the use of high pressure drop injection apertures and a high pressure fluid source as the flow stabilizing means has the advantage of stabilizing the fluid injection about the sizing sleeve circumference as well as stability of the overall fluid flow into the sizing sleeve.

Figure 3:
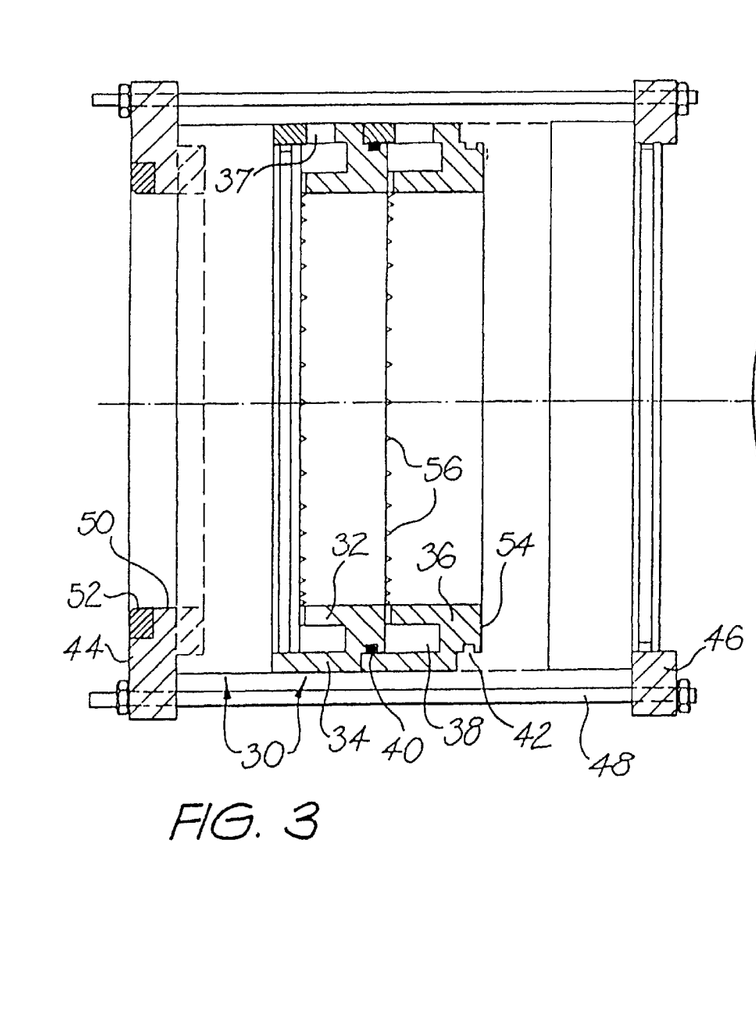
FIG. 3 is an elevation, partly in cross-section, of a modular sizing sleeve.
Figures 4, 5:
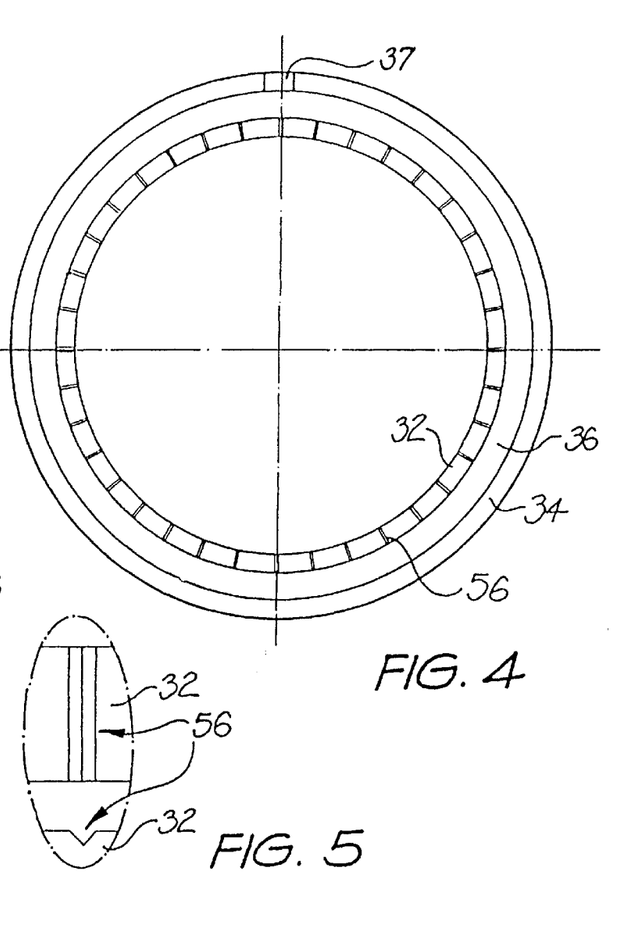
FIG. 4 is an end view of a segment of FIG. 4.
FIG. 5 is a detail of a groove cut into the end of the segment.

FIGS. 3 to 5 illustrate a modular sizing sleeve construction according to a further embodiment, which facilitates the formation of fine injection apertures.

The sizing sleeve is formed of a series of segments 30 each integrally comprising an inner ring portion 32, a bridging portion 36 at one end, and an outer coaxial ring portion 34 with an inlet or outlet aperture 37.

The inner and outer ring portions are offset axially and radially from each other, so that the fitting segments together forms a substantially continuous sizing sleeve surface surrounded by a series of annular manifolds 38. Each manifold is sealed against external leakage by an o-ring 40 in a groove 42 in one segment contacting a surface of the next segment, and the segments are held in place by a clamping arrangement consisting of a pair of clamping rings 44, 46 joined by a series of tie bars 48. The upstream clamping ring 44 may have an inner surface 50 acting as a lead in portion for the sizing sleeve, having a rounded entry part 52 formed of polymer material such as high density polyethylene (HDPE).

The front end face of each inner ring portion abuts the bridging portion rear face 54 of the adjoining segment, and has a series of radial grooves 56 milled therein. When adjacent segments are joined together and the manifolds connected to a high pressure fluid supply these grooves serve as the injection apertures for injection of the fluid to the inside of the sizing sleeve.

An advantage of this construction is that the size and shape of the injection apertures can be carefully controlled because the manufacture involves cutting notches into an end surface of each segment rather than laser or physical drilling through the body of the sizing sleeve. Very fine apertures can be produced, for example triangular notches about 0.1–0.2 mm deep and 0.1–0.3 mm wide (see FIG. 5), by conventional machining techniques. Another advantage of this construction is the ability to dismantle and clean the sizing sleeve in the event of blockage of the injection apertures.

The very fine aperture size causes high pressure drop and allows independent flow through each aperture, as discussed previously. For example, a pressure drop across the apertures of 3–4 MPa can be achieved. This is in practice many times greater than the pressure of the lubricating fluid to layer, which drives fluid exit at the drainage zones, and the inventors have found that it is highly desirable for the drainage apertures of each drainage zones to have a greater aperture area than the preceding pressurized zone. To achieve this, each segment to be used as a drainage zone may be spaced by a small amount, for example 0.2–2 mm, from the previous segment by a spacing member such as a shim in order to create a circumferential drainage slot of that width. By way of example, the sizing sleeve may consist of twelve such segments and have each fourth segment spaced by 0.5 mm to act as a drainage zone. Alternatively, special drainage segments can be provided, having a larger aperture area than the injection segments.

Figure 6:
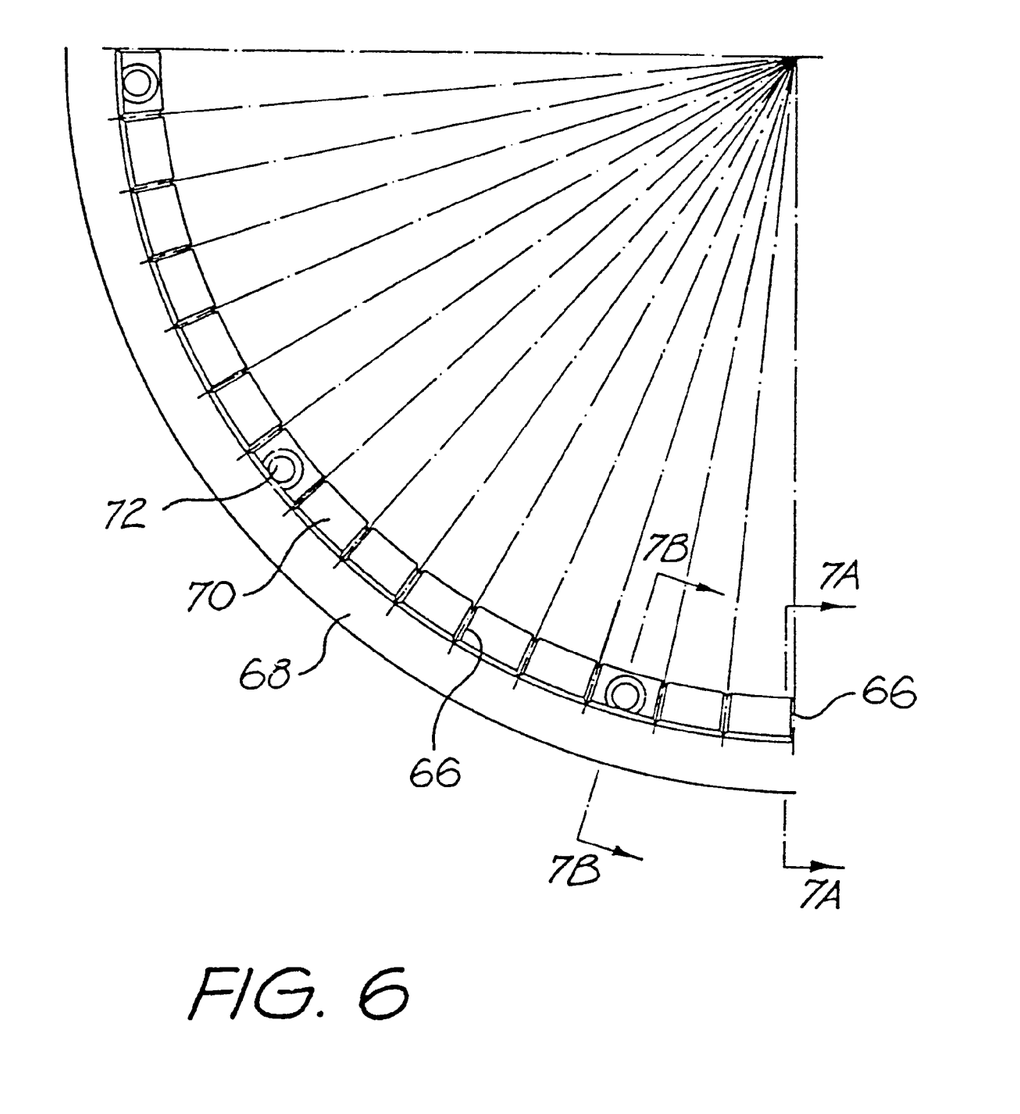
FIG. 6 is a partial end view of an alternative modular sizing sleeve.
Figure 7A:
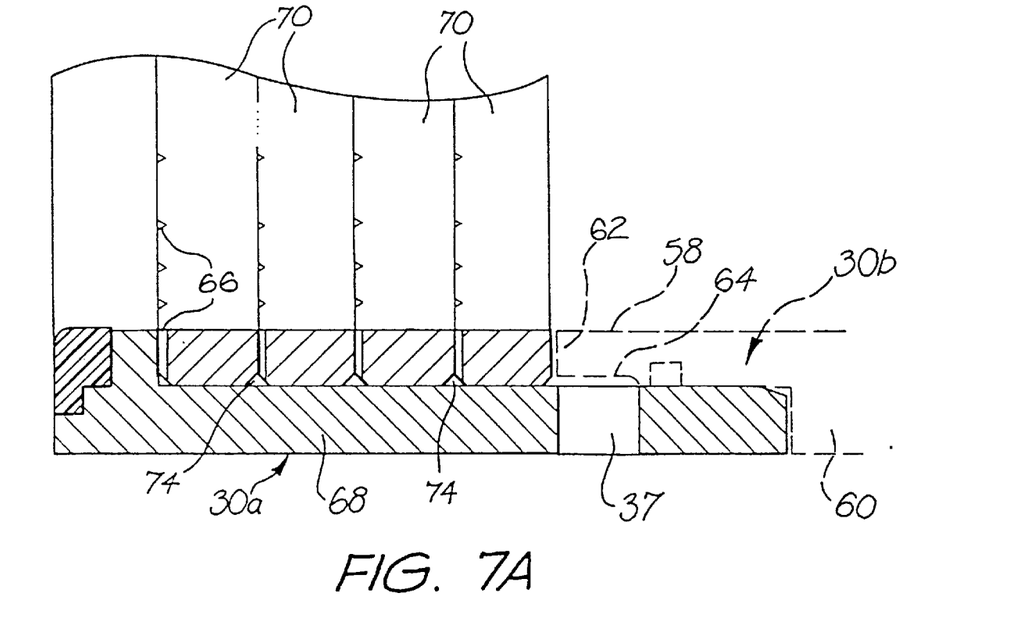
FIGS. 7A and 7B are part axial cross-sections taken along lines 7A—7A and 7B—7B respectively of FIG. 6.
Figure 7B:
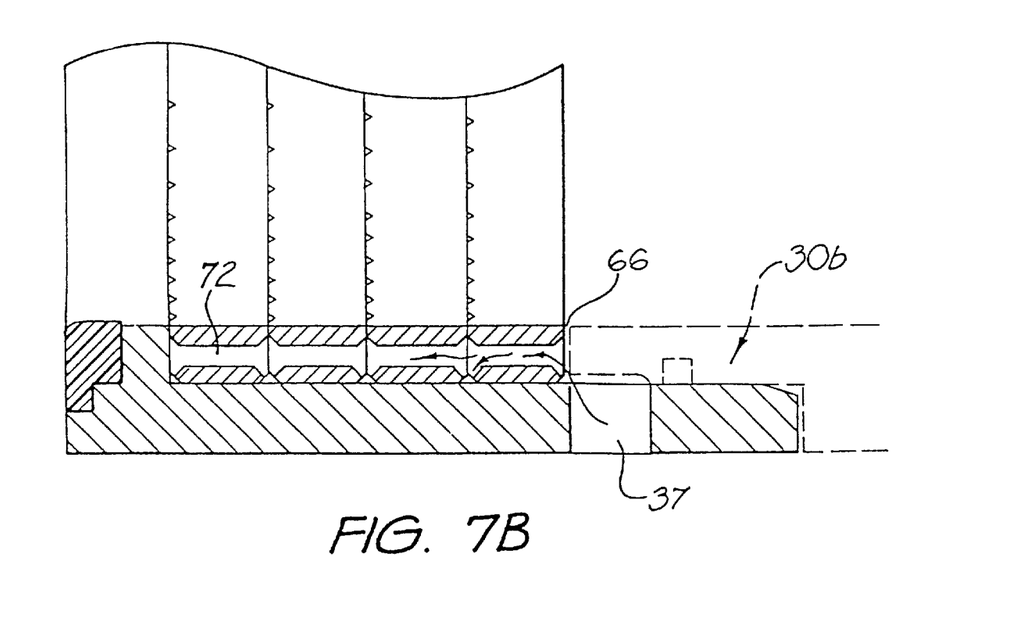

FIGS. 6 to 7B illustrate an alternative modular sizing sleeve, which allows water to be injected at several places along the length of each segment. The arrangement is particularly adapted for use as the first pressurized portion of the sizing sleeve, where cooling and lubrication requirements are high, but if required this construction may be extended along the length of the sizing sleeve.

In this construction, the structure of the sizing sleeve is formed by a number of overlapping segments, each containing a fluid inlet or drainage connection 37. As seen from FIG. 7A, the second and subsequent segment 30b integrate the inner part 58, forming the inner surface of the sizing sleeve, with the outer part 60 which includes the fluid connection 37. The end surface 62 of the inner part is notched as described above for FIGS. 4 to 6, to form injection or drainage apertures, and fluid passages 64 lead from the apertures 66 to the fluid connection 37.

The first segment 30a consists of an outer support ring 68 which mates with the second segment and has the fluid inlet 37, and a series of shorter inner rings 70 fitted inside to form the sizing sleeve inner surface. As seen in FIG. 7, the inner rings have aligned bores 72 running therethrough at angularly spaced locations. The inner rings also have radial grooves 66 in their end surfaces and are chamfered at their outer edges so that, when adjacent rings are abutted together the adjacent chamfers form a circumferential fluid distribution channel 74 communicating with the radial channels formed by the grooves. The bore 72 through each ring 70 is flared to provide fluid communication with the circumferential channels and thus provide fluid to the injection apertures.

Figure 8:
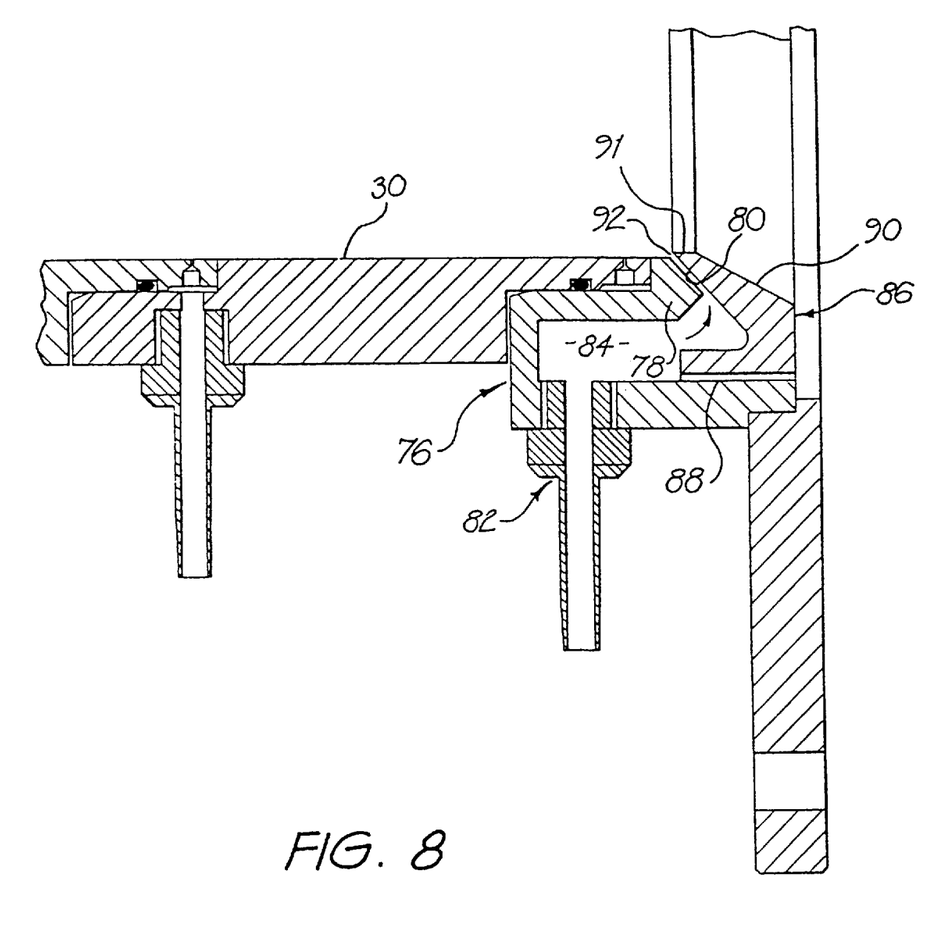
FIG. 8 is a part axial cross-section of an entry arrangement for the sizing sleeve.

FIG. 8 illustrates an alternative entry arrangement for the sizing sleeve, incorporating an adjustable width fluid injection aperture.

The illustrated entry arrangement is fitted to a sizing sleeve comprising segments of the type designated by reference numeral 30b in FIG. 7A, but is suitable for use with sizing sleeves of other types. A forwardly facing channel ring 76 has a flange 78 extending inwards to align with the inner surface of the sizing sleeve, with an inwardly angled front surface 80 surrounding the sizing sleeve opening. The outer part of the channel incorporates the fluid inlet port 82 for providing water to the manifold 84 defined within the channel. The front of the channel is closed off by an externally threaded entry flange 86 which screws into engagement with a fine internal thread 88 on the outer part of the channel. The front surface of the entry flange includes a frustoconical lead in portion 90 which extends inwards to a diameter slightly smaller, for example up to 1 mm or more preferably about 0.2 mm, than that of the sizing sleeve inner surface. The smaller diameter lip functions as a seal with the plastic tube which bears against it with a high pressure. The contact surface 91 should preferably have a hard coating such as DLC (diamond-like carbon) coating.

The entry flange rear surface is parallel to the front surface 80 of the inwards flange 78 to create a circular fluid injection slot. This injects the lubricating water behind the overhanging lip of the lead in portion 90 to form a lubricating layer which is carried along by the travelling tube. The width of the slot 92, and therefore the amount of liquid injected as the lubricating layer, may be adjusted by screwing the threaded flange 86 in or out relative to the channel ring 76.

Fluid injected in a first portion of the sizing sleeve may be at a higher temperature than the fluid injected further downstream, so that the tube travel in the initial part of the sizing sleeve is lubricated without cooling the tube so that it more readily adopts the shape of the sizing sleeve. In the remainder of the sizing sleeve, the injection fluid both lubricates and cools the tube.

In further modifications, the pressure and/or temperature profiles along the length of the sizing device can be controlled by varying the temperature and pressure of the fluid injected at various points along its length. In this way, it is possible to exert fine control over the final diameter of the resultant tube. For example, each pressurized sizing sleeve portion may have a separate fluid source with independently controllable temperature and pressure.

Figure 9:
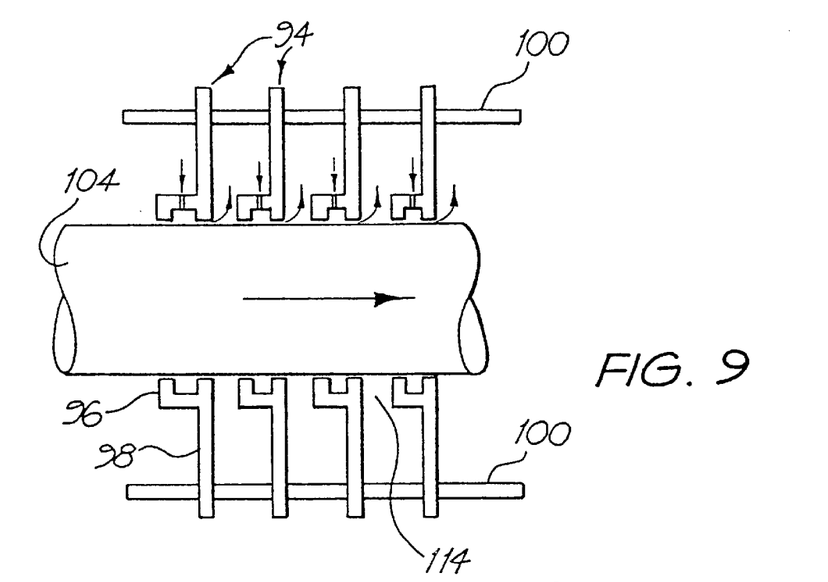
FIGS. 9 and 10 are axial views of a further embodiment.
Figure 10:
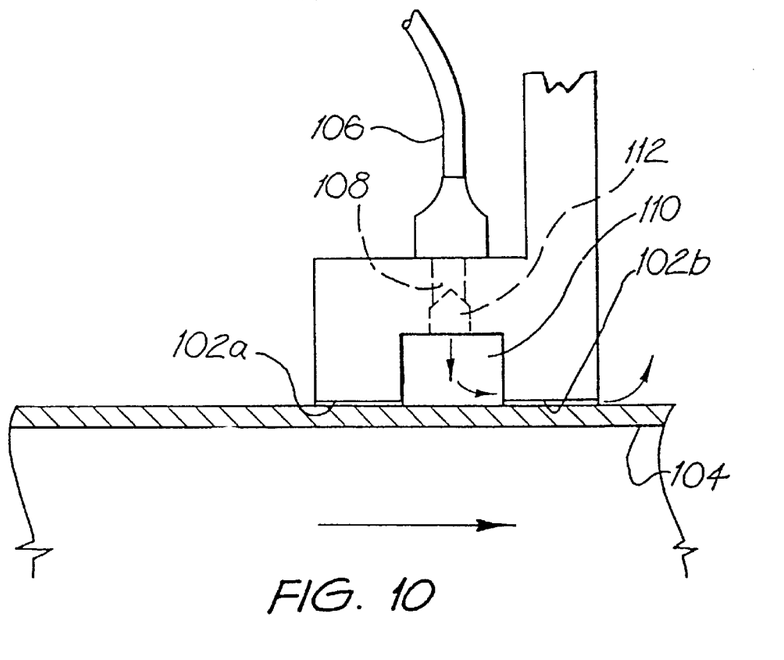

FIGS. 9 and 10 show a further embodiment of a modular sizing sleeve, in which each segment 94 consists of an inwards facing circumferential channel 96 with an outwards supporting flange 98. An array of the axial rods 100 pass through the support flanges 98 of the segments to hold them in an axially spaced formation. Each channel ring includes a pair of hardened inner surfaces 102a, 102b serving as sizing sleeve surfaces for supporting the travelling tube 104, and has a fluid supply 106, and injection aperture 108 leading to the annular space 110 defined between the channel and the tube. The injection fluid is supplied under pressure to this annular space 110 to support the tube in this region. The water flow through the apertures 108 may be adjustable by means of a threaded adjustment member 112 as best seen in FIG. 10.

The space 114 between the adjacent segments forms the drainage zone of the sizing sleeve, with the relative proportions of the injection and drainage zones being adjustable by changing the spacing of the segments. As illustrated, the sizing sleeve solid surface area, surfaces 102a and 102b, may be approximately equal to the remaining area presented by the spaces 110 and 114. Furthermore, with open contact between the tube 104 and cooling water in a cooling bath (not shown) in which the sizing sleeve is situated, the temperature control may predominantly be carried out by the cooling water rather than the injection water and application of vacuum to the tube exterior in the drainage zones is easily achieved. Warm water may be injected to the first segments to assist the tube to adopt the sizing sleeve diameter.

In addition, as there is not interfitting of the segments, it is a simple matter to grade the inner diameter of successive segments down slightly to accommodate slight shrinkage of the tube by cooling as it passes through the sizing sleeve.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. A sizing sleeve for controlling the outer diameter of an internally pressurized plastic tube traveling through the sizing sleeve, the sizing sleeve having an upstream and a downstream end relative to the tube travel, including at least two pressurized sizing sleeve portions each having means for injecting fluid under pressure substantially about the circumference of the tube to form a lubricating fluid layer between a sizing sleeve inner surface and the tube, each pressurized sizing sleeve portion comprising an inner sizing sleeve member having a plurality of injection apertures extending radially thereacross, an annular injection fluid manifold radially surrounding the inner sizing sleeve member and communicating with said apertures, wherein the inner sizing sleeve member includes a plurality of coaxial rings arranged end-to-end, the injection apertures being formed between end surfaces of adjacent rings, wherein the injection apertures are formed by grooves in one or more of said end surfaces, said manifold for communicating with a fluid supply and said grooves extending to the sizing sleeve inner surface, said injecting means including said injection apertures and said manifold.

2. A sizing sleeve according to claim 1 wherein said grooves extend substantially radially across said end surface.

3. A sizing sleeve according to claim 1 wherein said two pressurized sizing sleeve portions are axially separated and isolated from each other by a drainage zone including a drainage aperture formed as a gap between adjacent rings.

4. A sizing sleeve according to claim 1 wherein said injecting means is configured to communicate with the fluid supply such that the injection apertures cause a sufficiently high pressure differential between the manifold and the lubricating fluid layer so that a 50% variation in pressure of the lubricating fluid layer causes less than 20% variation in the rate of fluid injection through said apertures.

5. A sizing sleeve according to claim 4 wherein said injecting means is configured to communicate with the fluid supply such that pressure in said manifold exceeds the internal pressure in said tube.

6. A sizing sleeve according to claim 5 wherein said injecting means is configured to communicate with the fluid supply such that said manifold pressure exceeds 150% of the internal pressure in said tube.

7. A sizing sleeve according to claim 4 wherein said injection apertures have a diameter less than 0.5 mm.

8. A sizing sleeve according to claim 7 wherein said injection apertures have a diameter less than 0.25 mm.

9. A sizing sleeve according to claim 1 wherein the sizing sleeve includes an entry portion which projects radially inwards of said inner sizing sleeve surface.

10. A sizing sleeve according to claim 9 and including an injector for injecting a fluid behind said inwardly projecting entry portion.

11. A sizing sleeve according to claim 10 wherein said injector includes a circumferential slot located behind said entry portion.

12. A sizing sleeve according to claim 9 wherein said entry portion includes a hardened contact surface having a diamond-like carbon coating.

13. A sizing sleeve according to claim 1 wherein the fluid injecting means includes a flow stabilizer which reduces variation in the rate of fluid injection through said apertures caused by pressure variations in the lubricating layer.

14. A sizing sleeve according to claim 13 wherein said flow stabilizer is configured such that a 50% variation in lubricating layer pressure causes less than 20% variation in the rate of fluid injection.

15. A sizing sleeve according to claim 14 wherein said flow stabilizer is configured such that a 50% variation in lubricating layer pressure causes less than 10% variation in the rate of fluid injection.

16. A sizing sleeve according to claim 13 wherein the flow stabilizer comprises a high pressure fluid source and a constrictor for introducing a pressure drop greater than the lubricating layer pressure.

17. A sizing sleeve according to claim 16 wherein said constrictor comprises said injection apertures for injecting the fluid to the layer.

18. A sizing sleeve according to claim 17 wherein said apertures have a diameter of less than 0.5 mm.

19. A sizing sleeve according to claim 17 wherein the sizing sleeve has drainage means for removing fluid from the lubricating layer, said drainage means including one or more drainage apertures having a total drainage aperture area greater than a total area of said injection apertures.

20. A sizing sleeve for controlling the outer diameter of an internally pressurized plastic tube traveling through the sizing sleeve, the sizing sleeve having an upstream and downstream end relative to the tube travel, including at least two pressurized sizing sleeve portions each having an injector for injecting fluid under pressure substantially about the circumference of the tube to form a lubricating fluid layer between a sizing sleeve inner surface and the tube, characterized in the pressurized sizing portions being axially separated and isolated from each other by a drainage zone, wherein the sizing sleeve includes an entry portion which projects radially inwards of said inner sizing sleeve surface and the sizing sleeve includes a second injector for injecting a fluid behind said inwardly projecting entry portion wherein said second injector includes a circumferential slot located behind said entry portion and a screw connection is provided between said entry portion and a manifold to adjust the area of said slot.

* * * * *